United States Patent
Arment et al.

(10) Patent No.: US 8,349,073 B2
(45) Date of Patent: Jan. 8, 2013

(54) FAST SETTING STUCCO AND METHOD OF USE

(75) Inventors: Stephen James Arment, Apple Valley, CA (US); Donald Nelson Gilbart, Murrieta, CA (US)

(73) Assignee: Texas Industries, Inc., Dallas, TX (US)

( * ) Notice: Subject to any disclaimer, the term of this patent is extended or adjusted under 35 U.S.C. 154(b) by 143 days.

(21) Appl. No.: 13/071,584

(22) Filed: Mar. 25, 2011

(65) Prior Publication Data

US 2012/0240826 A1     Sep. 27, 2012

(51) Int. Cl.
C04B 11/00     (2006.01)

(52) U.S. Cl. ......... 106/724; 106/726; 106/772; 106/778

(58) Field of Classification Search ................. 106/724, 106/726, 772, 778
See application file for complete search history.

(56) References Cited

U.S. PATENT DOCUMENTS

| | | | |
|---|---|---|---|
| 4,088,804 A | 5/1978 | Cornwell et al. | |
| 4,184,887 A | 1/1980 | Lange et al. | |
| 4,225,358 A | 9/1980 | Maier | |
| 4,237,260 A | 12/1980 | Lange et al. | |
| 4,451,295 A | 5/1984 | Sprouse | |
| 4,460,720 A | 7/1984 | Gaidis et al. | |
| 5,472,499 A | 12/1995 | Crocker | |
| 5,609,681 A | 3/1997 | Drs et al. | |
| 5,685,903 A | 11/1997 | Stav et al. | |
| 5,911,819 A | 6/1999 | Drs et al. | |
| 6,077,910 A | 6/2000 | Ikuta et al. | |
| 6,238,476 B1 | 5/2001 | Sprinkle | |
| 6,290,769 B1 | 9/2001 | Carkner | |
| 6,299,679 B1 * | 10/2001 | Montoya | 106/730 |
| 6,641,658 B1 | 11/2003 | Dubey | |
| 6,869,474 B2 | 3/2005 | Perez-Pena et al. | |
| 6,929,875 B2 | 8/2005 | Savoly et al. | |
| 7,033,432 B2 | 4/2006 | Savoly et al. | |
| 7,101,430 B1 * | 9/2006 | Pike et al. | 106/705 |
| 7,670,427 B2 | 3/2010 | Perez-Pena et al. | |
| 2002/0157573 A1 | 10/2002 | Pellett | |
| 2008/0148997 A1 | 6/2008 | Blackburn et al. | |
| 2009/0078161 A1 | 3/2009 | Woolfsmith et al. | |
| 2009/0255443 A1 | 10/2009 | Francis | |

FOREIGN PATENT DOCUMENTS

| | | |
|---|---|---|
| WO | WO 86/00291 | 1/1986 |
| WO | WO 2008/088520 | 7/2008 |

OTHER PUBLICATIONS

Concrete Technology, Paper #1, Mar. 16, 2004.
Rapid Set Stucco Mix—Datasheet, Premium Pre-Mixed Stucco Material, Aug. 2010, CTS Cement Manufacturing Corporation, Cypress, CA, www.ctscement.com.

* cited by examiner

Primary Examiner — Paul Marcantoni
(74) Attorney, Agent, or Firm — Locke Lord, LLP

(57) ABSTRACT

A cementitious composition the properties of which are useful for: a) reducing shrinkage cracking in stucco systems due to excess water present in initial mixing required to achieve adequate slump necessary for application, but not necessary for material hydration b) reducing full thickness cracking as a result of minor structural movement by increasing the flexural strength, c) reducing the time required to place the layers of a three-coat exterior stucco system. The composition of this material is a blend of ASTM C 150 Portland cement, an ASTM C 1328 Plastic (Stucco) cement and a minor amount of a sulfonated naphthalene formaldehyde condensate (SNF), also described as Polynaphthalene sulfonates (PNS) cement superplasticizer, also known as a HRWR (High Range Water Reducer).

19 Claims, No Drawings

FAST SETTING STUCCO AND METHOD OF USE

BACKGROUND OF THE INVENTION

1. Field of Use

The invention relate to a cementitious exterior stucco material and, more particularly, to a cementitious exterior stucco material that is fast setting and resistant to shrinkage and full thickness cracking.

2. Related Art

In the southwest United States, the overwhelming percentages of structures, both residential and commercial, are built utilizing a stucco exterior wall system. The two typical stucco systems which are employed include a single coat system and a three-coat system.

A "single coat" system (which is somewhat of a misnomer) consists of a waterproof underlayment, lath, and a coat of cementitious material which is typically ¾" to ⅞" thick, followed by a color finish coat. A three coat system consists of a waterproof underlayment, lath, a first coat of cementitious material (scratch coat), a second coat of cementitious material (brown coat), and a third or finish (sometimes a color) coat.

Typically each coat of cementitious material is cured for a number of days before subsequent cementitious material layers are applied. This extended curing period applies before the color coat of a single coat system is applied, and it applies before both the brown coat and the color coat of a three coat system. Builders typically allow one to seven days between coats before applying a subsequent coat, which forces even small applications of three-coat external stucco to span a period of fifteen days or more.

The quality control standard governing the chemical and physical requirements for the material most often utilized for the cementitious layers is one or more of the following: ASTM C 91, Standard Specification for Masonry Cement or ASTM C 1328, Standard Specification for Plastic (Stucco) Cement, Type S or Type M, a Type I or Type II/V ASTM C 150, Standard Specification for Portland Cement and an ASTM C 206, Standard Specification for Finishing Hydrated Lime or an ASTM C 207, Standard Specification for Hydrated Lime for Masonry Purposes, lime.

The ability to work and spread the cementitious material on a surface is an important trait for stucco materials. In order to obtain the proper consistency (slump), water is typically added to the cementitious materials beyond the proportions necessary for chemical hydration of the cement. The addition of water, however, acts counter to other desired physical property of the stucco system.

Disadvantages of typical cementitious materials used in external stucco wall systems include: a) a significant time delay between the application of coats to enable curing of the stucco and/or evaporation of excess water, b) the tendency of the stucco system to develop cracks from shrinkage during curing which results from the evaporation of excess water, and c) full thickness cracking resulting from incidental movement (shifting) of the structure prior to the cementitious material developing adequate strength, due in part to the extended period of time necessary for the curing and evaporation process. Also, it is often necessary to spray or mist the applied stucco with water during the curing process in order to prevent crack development during the curing process. This generally necessitates additional labor costs.

It is desirable to produce a cementitious material to be used in stucco products which can be worked and applied easily, without creating the negative characteristics associated with addition of excess water. It is desirable to reduce the application period necessary for multiple coats of stucco, such as reducing the application period of a three-coat stucco system from the current time period of approximately fifteen days, down to as little as one day. It is desirable to reduce shrinkage cracking associated with excess water which is typically added to stucco systems for workability and ease of application, while at the same time shortening the time needed to cure and thereby reducing the potential for cracking that occurs when the surface shifts before it has cured.

Various objects of the present invention, include providing a composition, that when blended to a homogenous consistency, will provide a cementitious exterior stucco material that may be applied with either mechanical technique or hand application, (either a one coat application or a traditional three-coat application), is fast setting, shrinkage crack resistant, full thickness crack resistant, of superior flexural and compressive strength, with an initial set or workable life (board life) greater than 100 minutes. One or more of these objects are achieved by using the composition disclosed and claimed below.

SUMMARY OF THE INVENTION

In accordance with the current invention, a stucco composition is provided that combines proportions of ASTM C 1328, Plastic (Stucco) Cement with inter-ground limestone and air entraining agent, a second constituent of an ASTM C 150 high $C_3A$ Portland cement, and a third constituent, a select sulfonated naphthalene formaldehyde condensate (SNF) which can also be described as polynaphthalene sulfonates (PNS) or Superplasticizer, (High Range Water Reducer) superplasticizer.

Preferably, the present invention is a proportional blend of two types of hydraulic cements, (an ASTM C 150 Type I or Type III Portland Cement and an ASTM C 1328 Type S or Type M Plastic Cement), the proportions of which are primarily determined by the results of the Gillmore test and the chemistry of the two hydraulic cements; and a minor amount (8 to 10 oz per hundredweight of cementitious material) of a select powdered sulfonated naphthalene formaldehyde condensate (SNF), also described as Polynaphthalene sulfonates (PNS) chemical water reducing agent, which has a molecular weight of 12,000 grams per mole. The ingredients are dry blended in either a mechanical or pneumatic blender. Mixing is to be sufficient so that the minorminor material is evenly distributed throughout the product, maintaining a consistent water demand between 0.38 and 0.41 (ASTM 1328-05 mix times are extended to allow for activation of the chemical water reducing agent).

DETAILED DESCRIPTION OF THE PREFERRED EMBODIMENTS

The current invention may be better understood by the following discussion of various embodiments.

Cement is made by heating limestone (calcium carbonate), with small quantities of other materials (such as clay or other alumina bearing materials, an iron source, and a silica bearing material) in a pyro-processing system or rotary cement kiln to approximately 1450° C., in a chemical process known as calcination. The product of the kiln is known as clinker. The resulting hard substance, "clinker," consists primarily of hydrated calcium silicates and also contains some calcium aluminates and calcium aluminoferrites. The minor elements (alumina, iron, and silica) introduced along with the calcium carbonate prior to calcination are proportioned sufficient for the pyro-process system requirements and to have an end chemical composition consistent with the chemical requirements associated with the ASTM (American Society for Testing and Materials) requirements for the recognized cement type appropriate for the cement factory's market area. The main ingredient by volume and weight in Portland cement is the clinker. The end product, Portland cement, is produced by grinding the clinker and one or more forms of calcium sulfate (gypsum) in a cement finish mill system.

Different types of Portland cement are produced to comply with geographically mandated chemical and physical requirements. There are ten types of cement identified in ASTM C 150, and five in AASHTO (American Association of State Highway and Transportation Officials) M 85. In the areas of the United States, that utilize stucco in construction, (the west and southwest regions), sulfate resistant cement is required for all ground contact construction applications.

Type I Portland cement is general purpose cement suitable for all applications where the special properties of other types of Portland cement are not required. With Type I cement, the chemical requirement for tricalcium aluminate ($C_3A$) content and the fineness is not limited. Type I is not applicable for most applications in the West and Southwest U.S. and is not normally used.

Type II Portland cement is used where the potential for moderate sulfate attack exists. It is used in normal construction where sulfate levels in the ground or in the water are higher than normal, but not severe. It is not applicable in most of the West and Southwest where the potential for sulfate attack is severe.

Type III Portland cement produces high early strength compared to Type I or Type II. Chemically, it is similar to Type I cement except the tricalcium aluminate ($C_3A$) is limited to 15%. Physically, it is ground finer, increasing the total surface area. It is not applicable for ground contact in the West or the Southwest where sulfate attack is an issue, but is acceptable for other uses.

Type V Portland cement is used where the potential for severe sulfate attack exists. It is used in normal construction where sulfate levels in the ground or in the water are severe. Type V cement is often marketed as a Type II/V as it meets the requirements of both cement types. Type V, or Type II/V cement is the common Portland cement used in the West and the Southwest.

Sulfates in water or moist soil enter the concrete and react with the hydrated tricalcium aluminate ($C_3A$), resulting in scaling, cracking, and expansion of concrete. Type II Portland is limited to 8% tricalcium aluminate ($C_3A$) in the cement product. Type V, or Type II/V Portland cement is limited to 5% tricalcium aluminate ($C_3A$) in the cement product. There is no minimum requirement for tricalcium aluminate ($C_3A$) in the cement product.

Plastic cement is a hydraulic cement that meets the requirements of ASTM C 1328. It can used to make Portland cement based plaster or stucco. This material is predominately used in the southwest and western regions of the United States. Plastic cement consists of a mixture of cement and plasticizing materials such as limestone, hydrated or hydraulic lime and an air entraining agent.

Masonry cement is hydraulic cement designed for use in mortar for masonry construction that meets the requirements of ASTM C-91. Masonry cement consists of a mixture of cement and plasticizing materials such as limestone, hydrated or hydraulic lime.

Cement is manufactured close to the point of consumption with the type of cement manufactured based on the market requirements of the geographical area. In the West and Southwest market area for stucco, the cement required and produced is a Type V or a Type II/V Portland cement.

In the West and Southwest United States, plastic cement and masonry cement are made most often with the same clinker as Type V clinker. Type V cement, has a maximum tricalcium aluminate ($C_3A$) of five (5) percent. Type V clinker would necessarily be limited in tricalcium aluminate as a result. Tricalcium aluminate ($C_3A$) is a chemical compound that contributes to the hydration reaction required for early strength development.

In a preferred embodiment, the current invention is a blend of multiple types of hydraulic cements: Portland Cements and Plastic (Stucco) cements and a water reducing agent (HRWR or superplasticizer) that when selected and blended in proper proportion produce a superior plaster or stucco material that will have enhanced workability, rapid strength development, short installation time, shrinkage cracking resistance, and full thickness cracking resistance. The Plastic cement generally will already contain inter-ground limestone and an air entraining agent sufficient to provide from 8-20% air entrainment.

The blends of an ASTM C 150 such as a Type V, a Type II/V, a Type III or a finely ground Type I Portland cement and Plastic (Stucco) cement component are proportioned and blended in such a way that the end product is compliant with the current version of ASTM C 1328, Standard Specification for Plastic (Stucco) Cement and has a $C_3A$ level greater than 7% and preferably has a surface area measurement (Blaine) greater than 5800 cm/gm.

This composition allows the application of multiple coats of a multiple coat system without the delay associated with conventional curing. The use of the high $C_3A$ Portland cement and inter-ground limestone, (present in the Plastic cement) act as accelerators, and facilitate the overall fast set of the mixture while developing superior strength characteristics. This accelerated set allows for additional coats to be applied in a matter of hours as opposed to days. It is currently believed that the application of subsequent coats of cementitious material layers before the underlying layer has dried, or cured, completely promotes a stronger chemical and physical bond due to better utilization of available water for curing and therefore improved crystalline development.

The addition of excess water beyond what is required for product hydration has been found to be a primary source of most shrinkage cracking. To assist with the early strength development, it is also necessary to reduce the added excess water typically present in a plaster (stucco) material but that is not necessary for hydration without losing any of the workability of the material. A dry superplasticizer (sulfonated naphthalene formaldehyde condensate (SNF), also described as Polynaphthalene sulfonates, is utilized to achieve this property. Other water reducing agents may be employed but with less effective results. The presence of the superplasticizer in this cementitious material composition provides adequate slump, slump loss control, and hydration control which allows the product to be applied using mechanical equipment common with large wall surface installations as well as conventional hand applications, while limiting or minimizing the addition of excess water. It is particularly preferred to use a dry superplasticizer in order to be able to premix it with the other components to create a dry product that can be used at the job site without the need to combine additional ingredients prior to use beyond mixing with water as is the case with conventional stucco mixtures.

The current invention preferably utilizes the positive contributions of one or more available Portland cements and one or more Plastic (Stucco) cements. Specifically, the current invention utilizes a proportional blend of cement products or clinkers that will yield a total tricalcium aluminate ($C_3A$) up to eight (8) percent, that will have an initial set time of not less than 90 minutes or more than 150 minutes by ASTM C 266, and an air entrainment content not less than eight (8) percent or more than twenty (20) percent as measured according to ASTM C 185, which is the Standard Test Method for Air Content of Hydraulic Cement Mortar.

The composition of the preferred embodiment further exemplifies a superior flexural strength of greater than 1000 psi at 7 days using ASTM C-293, which is the Standard Test Method for Flexural Strength of Hydraulic-Cement Mortars. It possesses superior compressive strength of greater than 8000 lb at 28 days using ASTM C 109, which is the Standard Test Method for Compressive Strength of Hydraulic Cement Mortars (using 2-in. or [50-mm] cube specimens). The composition preferably has an initial set or workable life (board life) of greater than 100 minutes as determined by ASTM C 266, which is the Standard Test Method for Time of Setting of Hydraulic-Cement Paste by Gillmore Needles.

In addition, in the preferred embodiment the blend of cements will also yield product fineness (Blaine) of at least 5300 cm$^2$/g according to ASTM C 204, which is the Standard Test Method for Fineness of Hydraulic Cement by Air-Permeability Apparatus. This increase of surface area compared to that of like materials promotes a faster start to the strength developing chemical reaction of the cement's crystalline structure development.

Without being bound by theory, it is currently believed that the combination of the Portland and Plastic cements result in a particle size distribution that is twice as wide as with conventional stucco products and that this favorably affects the water uptake of the composition. The fine particles of the Type III Portland cement start the chemical reaction with water more quickly which has the effect of causing the large particles of the Plastic cement to hydrate earlier than they would normally.

As a result, in the preferred embodiment the composition has the same workability and handling characteristics as conventional stucco for approximately 45 to 60 minutes and preferably greater than 100 minutes and then quickly sets after that. This provides the additional benefit that use of the composition does not require any change in tools used or application technique or require additional worker training in order to achieve the benefits of the current invention. The current composition can be applied either mechanically or by hand application in either a one or a three coat process. The only difference compared to, the application process of conventional stucco products is that when applying the stucco composition of the current invention, the subsequent coats in a three coat application or the color coat in a single coat application can be applied hours after the application of the prior coat instead of having to wait days before applying the next coat. In fact, in a single coat application, the composition was ready for application of the color coat in less than one and a half hours after it was initially applied. Also, there is no need to mist the stucco composition as it cures in order to ensure that the rapid evaporation of water does not cause shrinkage cracks in the stucco layer.

In the preferred embodiment, the materials are pre-blended dry. This allows the product to be sold and transported to the job site as a single dry composition. All the user is required to do is add water and sand to the composition similar to the way that conventional stucco products are used. The technology for blending separately produced powders is most often a mechanical ribbon blender, however, pneumatic blenders as well as other types of blending and/or mixing devices known to those of skill in the art are also effective and may be used.

There are three common types of ribbon blenders: the double-ribbon agitator, the paddle/ribbon agitator, and the paddle-only agitator. The double-ribbon agitator has an outer and inner ribbon. The outer ribbon pushes material toward the center, and the inner ribbon pushes material away from the center. The paddle/ribbon agitator has an inner ribbon, but the outer ribbon is replaced with paddles. The paddle-only agitator has only paddles and no ribbon. All three are acceptable but the time required for homogenous blending differs depending on the type blender selected. A pneumatic mixer is another alternative that can provide improved mixing for the particle sizes, however it is more expensive, generally requires smaller batches and is not as readily available as the other blenders.

The combined chemical properties allow for good workability without addition of excess water, while causing rapid hydration (set) in a way that promotes rapid flexural strength gains. The compressive strength requirement for ASTM C 150, "Standard Specification for Portland Cement" is 17.0 MPa (2180 psi) at seven days for Type II and 15.0 MPa (2180 psi) at seven days for Type V, using the ASTM C-109 test method. Similarly, the strength requirement for ASTM C 1328, "Standard Specification for Plastic (Stucco) Cement" is 9.0 MPa (1300 psi) at seven days for Type 5 and 12.4 MPa (1800 psi) at seven days for Type M. The strength requirement for ASTM C 91, "Standard Specification for Masonry Cement" is 9.0 MPa (1300 psi) at seven days for Type 5 and 12.4 MPa (1800 psi) at seven days for Type M using the ASTM C-109 test method.

In contrast, the compressive strength of the composition of the preferred embodiment is 25.9 MPa (3760 psi) at 24 hours and 50.7 MPa (7340 psi) at seven days using the ASTM C-109 test method.

Similarly, a test of the composition of the preferred embodiment utilizing ASTM C-305 demonstrates a flexural strength of 690 psi in 24 hours and 1010 psi in 7 days. This is a significantly higher early strength than existing systems, which typically test at around 500 psi in 24 hours and 750 psi in 7 days. This developed early flexural strength is adequate to resist cracking due to incidental movement (shifting) of the surface. This full thickness cracking is a common point of failure during longer curing periods.

The benefits of the current invention are further illustrated by the following examples:

Reference Example 1

A sample of Rapid Set® Eisenwall® Stucco mix, which is commercially available from CTS Cement Manufacturing Corp. located in Cypress, Calif. was prepared in accordance with the package instructions by mixing 630 grams of the mix with 1620 grams of sand and 350 grams of water and mixed according to the ASTM 305 test method, except it was mixed for 4 minutes. This is advertised as a rapid set stucco mix. The resulting mix had a flow percentage of 112 and a temperature of 82° F. when the ambient temperature was 76° F. Three samples were tested in accordance with ASTM C 348, which is the standard test method for flexural strength of hydraulic-cement mortars. The samples were tested for their load in pounds and their modulus of rupture in psi at 24 hours, three days and seven days. The results are reported below in Table 1.

TABLE 1

| Sample | Age of Sample | Load (lbs) | Modulus of Rupture (psi) |
|---|---|---|---|
| 1 | 24 hours | 156.7 | 705 |
| 2 | 24 hours | 158.1 | 710 |
| 3 | 24 hours | 161.3 | 725 |
| Average | 24 hours | 158.7 | 715 |
| 1 | 3 days | 160.5 | 720 |
| 2 | 3 days | 158.2 | 710 |
| 3 | 3 days | 153.3 | 690 |
| Average | 3 days | 157.3 | 710 |
| 1 | 7 days | 169.2 | 760 |
| 2 | 7 days | 175.7 | 790 |
| 3 | 7 days | 153.6 | 690 |
| Average | 7 days | 166.2 | 750 |

Reference Example 2

A sample of Victor Plastic Cement mix, which is commercially available from Cemex located in Victorville, Calif. was prepared in accordance with the package instructions by mixing 630 grams of the cement mix with 1620 grams of sand and 355 grams of water and mixed according to the ASTM 305 test method, except it was mixed for 4 minutes. The resulting mix had a flow percentage of 112 and a temperature of 80° F. when the ambient temperature was 76° F. Three samples were tested in accordance with ASTM C 348, which is the standard test method for flexural strength of hydraulic-cement mortars. The samples were tested for their load in pounds and their modulus of rupture in psi at 24 hours, three days and seven days. The results are reported below in Table 1.

TABLE 2

| Sample | Age of Sample | Load (lbs) | Modulus of Rupture (psi) |
|---|---|---|---|
| 1 | 24 hours | 98.4 | 440 |
| 2 | 24 hours | 110.6 | 500 |
| 3 | 24 hours | 103.3 | 465 |
| Average | 24 hours | 104.1 | 470 |
| 1 | 3 days | 150.6 | 680 |
| 2 | 3 days | 160.5 | 720 |
| 3 | 3 days | 156.6 | 705 |
| Average | 3 days | 155.9 | 700 |
| 1 | 7 days | 171.3 | 770 |
| 2 | 7 days | 180.8 | 815 |
| 3 | 7 days | 182.5 | 820 |
| Average | 7 days | 178.2 | 800 |

Reference Example 3

A sample of TXI Riverside Plastic Cement, which is available from TXI, located in Riverside, Calif., was prepared in accordance with the package instructions by mixing 630 grams of the cement mix with 1620 grams of sand and 360 grams of water and mixed according to the ASTM 305 test method, except it was mixed for 4 minutes. The resulting mix had a flow percentage of 112 and a temperature of 79° F. when the ambient temperature was 76° F. Three samples were tested in accordance with ASTM C 348, which is the standard test method for flexural strength of hydraulic-cement mortars. The samples were tested for their load in pounds and their modulus of rupture in psi at 24 hours, three days and seven days. The results are reported below in Table 3.

TABLE 3

| Sample | Age of Sample | Load (lbs) | Modulus of Rupture (psi) |
|---|---|---|---|
| 1 | 24 hours | 132 | 595 |
| 2 | 24 hours | 114.8 | 515 |
| 3 | 24 hours | 130.8 | 590 |
| Average | 24 hours | 125.9 | 565 |
| 1 | 3 days | 173.9 | 785 |
| 2 | 3 days | 191.1 | 860 |
| 3 | 3 days | 177.0 | 795 |
| Average | 3 days | 180.7 | 810 |
| 1 | 7 days | 201.0 | 905 |
| 2 | 7 days | 214.0 | 965 |
| 3 | 7 days | 21.7 | 950 |
| Average | 7 days | 208.9 | 940 |

Example 4

A sample of a stucco composition made in accordance with the current invention was created by mixing 1000 pounds of a Type III of Portland Cement and 1000 pounds of a Type V Plastic Cement. The Type III cement had the following characteristics and chemical properties:

| Physical Properties | Value |
|---|---|
| 1 day strength (per C109) | 3190 psi (22.0 MPa) |
| 3 day strength (per C109) | 5200 psi (35.9 MPa) |
| 7 day strength (per C109) | 5950 psi (41.1 MPa) |
| 28 day strength (per C109) | 7140 psi (49.3 MPa) |
| Blaine Fineness (per C204) | 5310 cm$^2$/g (531 m$^2$/kg) |
| Paste False set (per C451) | 80% |
| Vicat Initial Set (per C191) | 70 minutes |
| Vicat Final Set (per C191) | 180 minutes |
| Air Content (per C185) | 7% |
| Autoclave Exp. (per C151) | 0.12% |

| Chemical Properties (per C114) | Percent |
|---|---|
| SiO2 | 20.0% |
| Al2O2 | 6.0% |
| Fe2O3 | 1.5% |
| CaO | 64.9% |
| MgO | 1.2% |
| SO3 | 3.3% |
| Na2O | 0.08% |
| K2O | 0.30% |
| LOI | 2.4% |
| Insoluble residue | 0.47% |

The Type V Plastic cement had the following characteristics

| Physical Properties | Value |
|---|---|
| 1 day strength (per C1328) | 1740 psi (12.0 MPa) |
| 3 day strength (per C1328) | 3430 psi (23.7 MPa) |
| 7 day strength (per C1328) | 4380 psi (30.2 MPa) |
| 28 day strength (per C1328) | 5680 psi (39.2 MPa) |
| Gilmore Initial Set (per C266) | 220 minutes |
| Gilmore Final Set (per C266) | 340 minutes |
| Air Content (per C1328) | 13% |
| Water retention (per C1506) | 79% |
| Autoclave expansion (per C1328) | 0.0 |
| No. 325 sieve (45-microns) | 99% passing |

Also added was 160 ounces (8 ounces per hundredweight of cement) of a polynaphthalene sulfonate cement superplasticizer having a molecular weight of 12,000 g/mole. The components were mixed in a single type ribbon mixer for 4 minutes until it was completely homogenous. The resulting composition had the following characteristics:

| Physical Properties | Value |
|---|---|
| 1 day strength (per C1328) | 3760 psi (25.9 MPa) |
| 3 day strength (per C1328) | 6440 psi (44.4 MPa) |
| 7 day strength (per C1328) | 7340 psi (50.7 MPa) |
| 28 day strength (per C1328) | 8390 psi (57.9 MPa) |
| Gilmore Initial Set (per C266) | 160 minutes |
| Gilmore Final Set (per C266) | 230 minutes |
| Air Content (per C1328) | 10% |
| Water retention (per C1506) | 81% |
| Autoclave expansion (per C1328) | 0.0 |
| No. 325 sieve (45-microns) | 99% passing |

This composition was then prepared by mixing 630 grams of the cement mixture with 1620 grams of sand and 360 grams of water and mixed according to the ASTM 305 test method, except it was mixed for 4 minutes. The resulting mix had a flow percentage of 108 and a temperature of 78° F. when the ambient temperature was 76° F. Three samples were tested in accordance with ASTM C 348, which is the standard test method for flexural strength of hydraulic-cement mortars. The samples were tested for their load in pounds and their modulus of rupture in psi at 24 hours, three days and seven days. The results are reported below in Table 4.

TABLE 4

| Sample | Age of Sample | Load (lbs) | Modulus of Rupture (psi) |
|---|---|---|---|
| 1 | 24 hours | 151.8 | 680 |
| 2 | 24 hours | 152.7 | 685 |
| 3 | 24 hours | 154.4 | 695 |
| Average | 24 hours | 153.0 | 690 |
| 1 | 3 days | 232.0 | 1,045 |
| 2 | 3 days | 216.0 | 970 |
| 3 | 3 days | 198.4 | 895 |
| Average | 3 days | 215.5 | 970 |
| 1 | 7 days | 238.0 | 1,070 |
| 2 | 7 days | 213.0 | 960 |
| 3 | 7 days | 222.0 | 1,000 |
| Average | 7 days | 224.3 | 1,010 |

As can be seen from Examples 1-4, the composition of the current invention provides significantly higher loads and modulus of rupture than the other currently available stucco mixes available. While it is preferred that the Type III and Plastic Type V cements are mixed together in a 50:50 ratio by weight, ratios of from 40:60 to 60:40 have been found to be advantageous. Similarly, which final compositions containing more than about 5 wt. % of $C_3A$ show improvement over previously available compositions, it is most preferred for the final composition to have a $C_3A$ percentage of about 8.5%.

The above description of certain embodiments are made for the purposes of illustration only and are not intended to be limiting in any manner. Other alterations and modifications of the preferred embodiment will become apparent to those of ordinary skill in the art upon reading the disclosure, and it is intended that the scope of the invention disclosed herein be limited only by the broadest interpretation of the appended claims to which the inventor is legally entitled.

What is claimed is:

1. A cementitious composition for use in a one coat or three coat stucco application, the composition comprising:
   a Portland cement meeting the requirements of ASTM C150 and having a $C_3A$ composition greater than about 7% by weight based upon the cement;
   a Plastic stucco cement meeting the requirements of ASTM C 1328;
   a sulfonated naphthalene formaldehyde condensate in an amount of from about 8 to about 10 ounces per hundredweight of cement;
   wherein the Portland cement and Plastic stucco cement are present in a ratio sufficient for the composition to have a $C_3A$ content greater than 7% by weight based upon the cement, an initial set time of from about 90 to about 150 minutes, an amount of air entrainment from about 8 to about 20 percent, and a surface area greater than about 5300 cm/g.

2. The composition of claim 1 wherein the composition has a water demand of from 0.38 to about 0.41.

3. The composition of claim 1 wherein the sulfonated naphthalene formaldehyde condensate is powdered.

4. The composition of claim 3 wherein the sulfonated naphthalene formaldehyde condensate has a molecular weight of about 12,000 grams per mole.

5. The composition of claim 1 wherein the $C_3A$ content of the composition is less than about 8% by weight based upon the cement.

6. The composition of claim 1 wherein the surface area is greater than about 5800 cm/g.

7. The composition of claim 1 wherein the initial set time is greater than about 100 minutes.

8. The composition of claim 1 wherein the flexural strength of the composition is greater than 1,000 psi at 7 days after application.

9. The composition of claim 1 wherein the compressive strength of the composition is greater than about 8,000 pounds at 28 days after application.

10. The composition of claim 1 wherein the Portland cement is selected from the group consisting of Type I, Type II, Type V, or Type III, and mixtures thereof.

11. The composition of claim 10 wherein the Portland cement is Type III Portland cement.

12. The composition of claim 1 wherein the composition has a strength greater than about 2690 in 24 hours after application.

13. A cementitious composition for use in a one coat or three coat stucco application, the composition comprising:
   a Type III Portland cement meeting the requirements of ASTM C150 and having a $C_3A$ composition greater than 7%;
   a Plastic stucco cement meeting the requirements of ASTM C 1328;
   a sulfonated naphthalene formaldehyde condensate in an amount of from about 8 to about 10 ounces per hundredweight of cement;
   wherein the Type III Portland cement and Plastic stucco cement are present in ratio of from 40:60 to 60:40 by weight;
   wherein the composition has a $C_3A$ content greater than 7% by weight based upon the cement, an initial set time of from about 90 to about 150 minutes, an amount of air entrainment from about 8 to about 20 percent, and a surface area greater than about 5300 cm/g;
   wherein the composition is adapted for use in a stucco application where sulfate attack is an issue.

14. The composition of claim 13 wherein the ratio of Type III Portland cement to Plastic cement is about 50:50 by weight.

15. The composition of claim 13 wherein the composition has a water demand of from 0.38 to about 0.41.

16. The composition of claim 13 wherein the sulfonated naphthalene formaldehyde condensate is powdered.

17. The composition of claim 16 wherein the sulfonated naphthalene formaldehyde condensate has a molecular weight of about 12,000 grams per mole.

18. The composition of claim 13 wherein the $C_3A$ content of the composition is less than about 8% by weight based upon the cement.

19. The composition of claim 13 wherein the surface area is greater than about 5800 cm/g.

* * * * *